United States Patent
Bäder

(10) Patent No.: US 12,272,997 B2
(45) Date of Patent: Apr. 8, 2025

(54) METHOD FOR RESHAPING CONDUCTOR PIECE ARRANGED IN A STATOR CORE

(71) Applicant: Gehring Technologies GmbH + Co. KG, Ostfildern (DE)

(72) Inventor: Christoph Bäder, Altbach (DE)

(73) Assignee: Gehring Technologies GmbH + Co. KG, Ostfildern (DE)

(*) Notice: Subject to any disclaimer, the term of this patent is extended or adjusted under 35 U.S.C. 154(b) by 395 days.

(21) Appl. No.: 17/755,886

(22) PCT Filed: Nov. 12, 2020

(86) PCT No.: PCT/EP2020/081871
§ 371 (c)(1),
(2) Date: May 11, 2022

(87) PCT Pub. No.: WO2021/094433
PCT Pub. Date: May 20, 2021

(65) Prior Publication Data
US 2022/0385149 A1    Dec. 1, 2022

(30) Foreign Application Priority Data
Nov. 12, 2019    (DE) .............. 10 2019 130 534.9

(51) Int. Cl.
*H02K 15/00*    (2006.01)
*B21D 53/00*    (2006.01)

(52) U.S. Cl.
CPC ......... *H02K 15/0037* (2013.01); *B21D 53/00* (2013.01); *Y10T 29/49009* (2015.01)

(58) Field of Classification Search
CPC ............ H02K 15/0081; H02K 15/0037; Y10T 29/49009
(Continued)

(56) References Cited

U.S. PATENT DOCUMENTS

| 7,084,541 B2* | 8/2006 | Gorohata | H02K 3/505 |
| | | | 310/180 |
| 10,673,310 B2* | 6/2020 | Yoshida | H02K 15/0428 |

(Continued)

FOREIGN PATENT DOCUMENTS

| AT | 520311 A4 | 3/2019 |
| DE | 60309539 T2 | 8/2007 |

(Continued)

OTHER PUBLICATIONS

International Search Report and Written Opinion—PCT/EP2020/081871, filed Nov. 12, 2020. pp. 1-9. Mailing date of Search Report Mar. 9, 2021.

(Continued)

*Primary Examiner* — Thiem D Phan
(74) *Attorney, Agent, or Firm* — BOND, SCHOENECK & KING, PLLC; George R. McGuire

(57) ABSTRACT

The invention relates to an apparatus and a method for reshaping one or more conductor pieces arranged in a stator core, wherein a plurality of conductor pieces is arranged in the stator core, the conductor pieces being arranged on a plurality of circular paths running in a circumferential direction in rows which extend in a radial direction, and wherein the reshaping takes place in a free end of the conductor piece projecting out of the stator core.

6 Claims, 11 Drawing Sheets

(58) Field of Classification Search
USPC .......................................... 29/596, 605, 606
See application file for complete search history.

(56) References Cited

U.S. PATENT DOCUMENTS

2015/0059164 A1  3/2015  Onda et al.
2020/0274425 A1  8/2020  Miyazaki et al.

FOREIGN PATENT DOCUMENTS

| DE | 102017213967 A1 | 2/2019 |
| DE | 102018103930 A1 | 8/2019 |
| JP | 2012175748 A | 9/2012 |
| JP | 2014158413 A | 8/2014 |
| JP | 2016131425 A | 7/2016 |
| WO | 2019104362 A1 | 6/2019 |

OTHER PUBLICATIONS

Examination Report of Priority Application DE10 2019 130 534.9 , filed Nov. 12, 2019. pp. 1-17.

* cited by examiner

METHOD FOR RESHAPING CONDUCTOR PIECE ARRANGED IN A STATOR CORE

CROSS REFERENCE TO RELATED APPLICATIONS

This is a National Stage Application filed under 35 U.S.C. 371 based on International Patent Application No. PCT/EP2020/081871, filed on Nov. 12, 2020, which claims priority to German Application Number 10 2019 130 534.9, filed Nov. 12, 2019, the entire disclosures of each of which are hereby incorporated herein by reference in their entirety.

BACKGROUND

The invention relates to an apparatus for reshaping a conductor piece arranged in a stator core, and to a corresponding method.

With the so-called hairpin technology, hairpin-shaped conductor pieces (hairpins) are used in the broadest sense together with individual different types of special pins in a stator core. In this case, hairpins are conductor pieces having essentially two longitudinally extended members and a connecting portion connecting these two members. The plurality of conductor pieces is usually arranged in such a way that the conductor pieces are arranged on a plurality of circular paths running in a circumferential direction in rows, each of which extends in a radial direction. The free ends of the members project out of the stator core on one side thereof and the connecting portions are arranged on the other side of the stator core.

After insertion, the free ends are twisted or bent in the circumferential direction, wherein this step is also referred to as "twisting." In the process, individual hairpins (generally conductor pieces or the free ends thereof) are twisted clockwise and others counterclockwise in the circumferential direction. Typically, the hairpins are twisted in such a way that, after twisting, they are arranged in a directly adjacent row or in a row after that (it is also conceivable that further rows are skipped). The twisting is carried out, for example, by means of cylinders which are arranged concentrically to one another and are rotatable, wherein conductor pieces which are arranged on a circular path are accommodated in each case in a cylinder in corresponding receptacles. Twisting the cylinders relative to each other bends the conductor pieces onto adjacent circular paths in different directions.

Before twisting, it may be desirable to bend the hairpins radially outward. The invention is concerned with this reshaping step and provides an apparatus, the use of which provides a method for the corresponding reshaping, in particular of the radially outer hairpins.

After twisting, the hairpins are usually cut to length (shortened to a provided length), and then certain hairpins/conductor pieces or the free ends thereof are welded together in order to form the windings of the stator. In order to shorten the hairpins and mask them for the welding process (this prevents hot material from entering the stator), a plate-like cover with recesses is often placed over the free ends so that the free ends are located in the recesses. When cutting to length, the free ends protruding beyond the cover are then cut off by means of a planer. Other types of cutting to length can be provided.

SUMMARY OF THE INVENTION

The object of the invention is to provide an apparatus and a method with which the reshaping of conductor pieces in a stator core prior to twisting can be carried out as quickly and precisely as possible. In the following, the apparatus will be explained in detail first and then the method. Aspects that are described in connection with the apparatus can also relate to preferred configuration of the method; conversely, aspects that are described in connection with the method can also relate to preferred configuration of the apparatus. In terms of the invention, the apparatus according to the invention is to be used in particular for carrying out the method according to the invention.

The Apparatus

The object is achieved by an apparatus for reshaping one or more conductor pieces arranged in a stator core, wherein the apparatus comprises:

A receptacle for accommodating a stator core. A plurality of conductor pieces are arranged in the stator core. They are typically arranged in rows in a circumferential direction. Each row extends in a radial direction. The radial direction is oriented radially outward from the center point of the stator core. The stator core is in a machining position in the receptacle. At this point, the conductor pieces to be reshaped are in an initial configuration. In the initial configuration, i.e., before the reshaping, the conductor pieces project extended along a longitudinal direction out of the stator core. The reshaping takes place at the free ends of the conductor pieces projecting out of the stator core.

In particular, the conductor pieces have a rectangular conductor cross section, wherein the corners of the cross section can be rounded off. Furthermore, the conductor pieces typically have electrical insulation.

A bending unit for reshaping one or more conductor pieces, wherein the bending unit comprises a positioning unit.

The positioning unit serves to position the bending unit with respect to the stator core, which is arranged in the receptacle. The positioning unit is not moved during the reshaping process of the conductor piece or conductor pieces.

The bending unit further includes a contact portion. This is configured in such a way that with it the conductor piece or the conductor pieces is/are contacted laterally in relation to the longitudinal extension of the conductor piece or the conductor pieces. The contacting is typically done loosely, without a gripping or clamping contact. In particular, the conductor piece or conductor pieces is/are additionally contacted by the contact portion from above, i.e., in the direction of the stator core.

Furthermore, the bending unit has an actuator. This is arranged and configured in such a way that the contact portion can be moved relative to the positioning unit, so that the conductor piece or conductor pieces can be reshaped.

The contact portion is mounted in the positioning unit in such a way that the contact portion carries out a first movement step when the actuator is actuated. In this case, the contact portion is moved relative to the positioning unit in a first bending direction. Depending on the desired direction in which the conductor pieces are to be bent, the first bending direction can be the radial direction or the opposite direction. However, it can also be a direction orthogonal to the radial direction. The bending direction can also be aligned obliquely to the radial direction and to the direction orthogonal thereto.

During the first movement step, the pivot position of the contact portion is not changed. In other words, the alignment of the contact portion, in particular with respect to the longitudinal axis, remains the same. The conductor piece or conductor pieces to be reshaped or the parts thereof accommodated in the contact portion follow the movement of the contact portion, so that the conductor piece bends at a first bending point and at a second bending point.

In a second movement step, the movement of the contact portion in the first bending direction is superimposed with a pivoting movement in a second bending direction of the contact portion. In this case, the second bending direction is directed counter to the first bending direction. In the second movement step, for example, the contact portion is moved radially outward in a translatory manner (and possibly moved slightly in the direction of the stator core) and is additionally pivoted radially inward. In a superimposed manner, a movement results in which the side of the contact portion facing the stator core is moved further radially outward than the side of the contact portion facing away from the stator core.

The first movement step is performed before the second movement step. With the first movement step, among other things, a corresponding distance is initially created between the conductor pieces that project straight out of the stator core and the reshaped conductor pieces. During the second movement step, the contact portion can be pivoted in the second bending direction, which is directed counter to the first bending direction or counter to the radial direction, without the conductor pieces of the pivoting movement that are extended along the longitudinal direction and project straight out of the stator core effectively being in the way.

In the second movement step, the end of the contact portion which faces the stator core is moved further in the first bending direction than a portion of the contact portion which is arranged further away from the stator core or the receptacle. The pivoting movement causes the free end of the conductor piece or conductor pieces to be bent effectively in the second bending direction.

In the first movement step, the region around the free end, an end portion extending longitudinally from the free end and terminating in the second bending point, is effectively held in its longitudinal orientation. To this end, it is accommodated within the contact portion. As a result of the movement of the contact portion (e.g., radially outward) in the first bending direction, a central portion adjoining the end portion and extending between the first bending point and the second bending point is pivoted radially outward relative to the part of the conductor piece which is arranged so as to be held immovably in the stator core. In order to now anticipate a springback of the material and ultimately to obtain the desired configuration of the conductor piece after removal of the contact portion, the pivoting movement in the second bending direction is superimposed in a second movement step on the movement in the first bending direction. When the contact portion is released from the free ends of the conductor pieces, the central portion on the one hand pivots counter to the first bending direction, i.e., for example, radially inward, and on the other hand the end portion pivots radially outward. In order to compensate for this in advance, the radially outward movement is on the one hand carried out further than is required for the end position (if the material does not spring back) and on the other hand the free end of the end portion is tilted radially inward relative to the central portion (second movement step).

The bending around the first bending point and the bending around the second bending point can therefore be carried out at a larger angle in each case than is actually desired in the final deformed state in order to compensate for or anticipate springback caused by the elasticity of the material. For the bending around the first bending point, this can be brought about by the contact portion being moved further in the first bending direction than is actually provided in the final deformed position. The further the contact portion and the entrained conductor piece or conductor pieces are moved in the first bending direction, the further the central portion is pivoted outward, for example. The second bending can be brought about by the pivoting movement of the contact portion in the second bending direction. The further the contact portion and the entrained end portion of the conductor piece or conductor pieces are pivoted, the more inwardly the end portion is tilted with respect to the central portion.

With such a targeted overbending, a springing back of the conductor piece after bending can be at least partially, at best completely, compensated for. The springback is necessarily caused by various circumstances. These are, for example, the material of the conductor piece (usually copper) or the quality thereof, the thickness of the conductor piece, the temperature, etc.

It is therefore possible to bend the conductor piece or conductor pieces and thus widen them in such a way that the end of the conductor piece facing away from the connecting portion, and in particular the end portion of the conductor piece, is again aligned parallel to the longitudinal direction after being bent twice.

In the apparatus according to the invention, both movement steps are typically effected by means of the same actuator. The movement steps are usually not separated in time, rather, the second movement step directly follows the first movement step.

In the operating position, the conductor piece or conductor pieces is/are accommodated in the contact portion.

The contact portion is configured in particular like a sleeve. Like a sleeve means a longitudinally extended cavity for receiving one or more conductor pieces. It has a first end which, in the operating position, faces the stator core and is open in order to introduce the conductor pieces into the cavity. The contact portion also has a second end which is opposite the first end, faces away from the stator core when in the operating position and is in particular closed. The closed end can serve as a stop for the ends of the conductor pieces. In this way, the same extent of conductor pieces can always be accommodated in the contact portion in a simple manner.

The conductor piece or conductor pieces is/are inserted with its/their free end(s) projecting out of the stator core through the open first end of the contact portion up to the second closed end of the contact portion. Typically, the conductor piece rests laterally against an inner wall of the contact portion that extends laterally, that is to say along the longitudinal extension of the conductor piece. In the received state, the free end of the conductor piece or pieces is in contact with the inner wall of the closed end of the contact portion. The second, closed end of the contact portion thus forms effectively a vertical stop for the free end of the conductor piece or conductor pieces.

The bending unit preferably has a first guide element and a second guide element. The first guide element is mounted in the second guide element so as to be pivotable about a pivot point of the first guide element.

The first guide element is in particular pretensioned into a contact position (a specific pivot position relative to the second guide element). In the contact position, the first guide element rests against a stop (later also referred to as the fourth stop) of the second guide element. This can be effected by means of a spring. Correspondingly, the first guide element can be pivoted away from the stop against the spring bias. The stop just mentioned therefore limits the pivotability of the first guide element.

Furthermore, the first guide element is coupled to the contact portion in such a way that a pivoting movement of the first guide element is transmitted to the contact portion. The contact portion is thus also pivoted with a pivoting movement of the first guide element.

The contact portion can be moved in particular relative to the first guide element along an extension axis of the first guide element. The extension axis of the first guide element is also pivoted during a pivoting movement of the first guide element.

In particular, the contact portion can be movable along an extension axis relative to the pivot point of the first guide element. The distance between the contact portion and the pivot point can therefore be changed in this embodiment.

In particular, the contact portion is pretensioned along the extension axis of the first guide element in the operating position in the direction of the stator core. This can be effected by means of a spring (in particular leaf spring(s)).

The second guide element is guided in a movable manner in relation to the positioning unit along the first bending direction and is guided in particular in a straight line (movable in a translatory manner). In other words, the second guide element can only be moved in a translatory manner along one degree of freedom in the positioning unit. The pivot point of the first guide element is preferably arranged on or in the second guide element and is immovable with respect to the second guide element. The pivot point thus follows the movement of the second guide element and thus transmits the translatory movement of the second guide element to the first guide element.

The pivot point of the first guide element on or in the second guide element is typically arranged between the stop limiting the pivotability of the first guide element and the contact portion (in particular along the direction in which the second guide element is movable with respect to the positioning unit).

The positioning unit preferably comprises a U-shaped frame element. The first guide element and the second guide element are movably mounted in the frame element.

The frame element may include a first stop arranged in the first bending direction. The first stop serves for contacting the first guide element when it is moved in the first bending direction (moved in a translatory manner with respect to the frame element). When the first guide element is moved together with the second guide element in a translatory manner relative to the frame element, it can contact the first stop and is thereby pivoted with respect to the second guide element.

The pivot point, in which the first guide element is connected to the second guide element, can be arranged, in particular in relation to the longitudinal direction, between the first stop and the contact portion.

The designations first, second, third, etc. should not assign a ranking to the elements designated in each case and should not necessarily require the predecessors thereof (therefore there can be a second stop or similar without a corresponding first stop). The designations only serve to improve legibility and distinguishability of the individual elements mentioned.

The frame element also has, in particular, a second stop. This second stop is used for contacting the second guide element when said guide element is moved in the first bending direction. The second stop limits movement of the second guide element (relative to the frame element) in the first bending direction.

The frame element can have a third stop, which is used for contacting the second guide element when said guide element is moved counter to the first bending direction. The second guide element can therefore be moved back and forth in and counter to the first bending direction relative to the frame element between the second stop and the third stop.

A fourth stop can be provided in the second guide element, wherein said stop is configured to limit the pivot positioning of the first guide element relative to the second guide element in the first bending direction. In particular, the first guide element is braced in a contact position against this fourth stop. This can be effected by means of a spring. In an initial position of the apparatus, the first guide element is in this contact position.

The second guide element can have a fifth stop, which limits the pivot positioning of the first guide element relative to the second guide element counter to the first bending direction. The first guide element can therefore be pivoted relative to the second guide element between the fourth stop, against which it rests in the contact position, and the fifth stop, which limits the maximum pivotability out of the contact position.

In particular, the first guide element is braced in a position pivoted away from the fifth stop. As already mentioned above, this can be implemented using a spring, which namely tensions the first guide element into a contact position against the fourth stop. The pretensioned position of the first guide element, pivoted away from the fifth stop, is the contact position.

The position of the first stop, the second stop, the third stop, the fourth stop and/or the fifth stop is preferably adjustable. If there are further stops, they can also be adjustable in their position.

In particular, the contact portion is movably guided, in particular guided in a translatory manner, in the first guide element, in particular by means of a piston rod. The piston rod can be pretensioned. This can be effected by means of a spring in the form of e.g., one or more leaf springs. Thus, the contact portion or the piston rod can only move along one degree of freedom in relation to the first guide element. This degree of freedom extends along the piston rod and in particular along the extension axis of the first guide element.

The actuator (the actuator is typically a linear actuator) preferably has a joint or an articulated connection to the contact portion. This is used in particular to compensate for the pivoting movement of the contact portion. Such a joint can, for example, be configured in the form of a fork head, in which the contact portion is arranged in a pivotably mounted manner.

The apparatus can comprise a counter-bearing device. A counter-bearing portion of this counter-bearing device can be placed against a conductor piece. A first bending point is defined by applying the counter-bearing portion.

The counter-bearing device, the frame element and/or the actuator can be arranged essentially in one plane. This results in a compact design of the apparatus and a compact and in particular narrow design of the bending unit.

However, the first bending point can also be defined by an edge that is formed by the stator core itself or by the side of the stator core that faces the free ends of the conductor pieces, so that the first bending point is located in a region of the conductor piece or the conductor pieces that is/are directly adjacent to the stator core. The edge of the stator core can be rounded, for example to avoid damaging the conductor piece and/or the insulation of the conductor piece. It is also conceivable to use an insert, e.g., a plastics insert, in the stator and/or a mask, e.g., a plastics mask, to be placed on the stator in order to create the edge that defines the first bending point.

Furthermore, the counter-bearing portion can be placed against the conductor piece by a movement of the counter-bearing device in the second bending direction. In this context, the counter-bearing device in particular performs a radially inwardly directed movement relative to the stator core. For this purpose, the apparatus can have a corresponding bearing of the counter-bearing device.

The counter-bearing portion is preferably arranged in such a way that it can be placed directly by the region of the conductor piece that adjoins the stator core. It is thus possible for the free end of the conductor piece (or conductor pieces) projecting from the stator core to be bent in the immediate vicinity of the stator core. As a result, a more compact twisted region of the conductor pieces can be realized, particularly in the longitudinal direction, and thus an overall more compact design of the stator is possible.

The counter-bearing portion is in particular at least partially rounded. The rounded shape of the counter-bearing portion prevents damage to the conductor piece and/or the insulation of the conductor piece. Furthermore, the bend can be defined geometrically by the size of the counter-bearing portion. The radius of the bend corresponds to the radius of the rounded shape of the counter-bearing portion and can thus be varied in a targeted manner with the size of the rounded shape of the counter-bearing portion.

The contact portion can have an edge (in particular rounded) which is provided for insertion between two conductor pieces lying against one another, and for this purpose has a shape that tapers in the direction of the stator core or the receptacle. The edge serves to facilitate the engagement of the contact portion between two adjacent conductor pieces and to easily remove them from one another in order to then carry out the actual bending process. For example, the edge provided for insertion between the conductor pieces can be rounded, wherein the radius of the rounding is less than 1 mm, in particular less than 0.75 mm, in particular less than 0.5 mm. The rounding prevents damage to the insulation of the conductor pieces, wherein there is nevertheless a sufficiently slim profile of the edge for it to be pushed between the conductor pieces, thereby forcing them apart. This edge also forms the second bending point determined by the position of the contact portion.

The contact portion may include a through hole for receiving the conductor pieces. Alternatively, the contact portion can also be configured like a blind hole or in any case have a wall portion which is configured and arranged for contacting the free ends of the conductor pieces from the head side thereof.

The contact portion can include a clamping device that is configured to clamp the conductor pieces that are accommodated in the contact portion in the direction of the contact wall of the contact portion that defines the second bending point, or to press them against this contact wall.

The contact portion may include a rounded edge for engagement between two adjacent conductor pieces. The contact portion can have a clamping device for the clamping bracing of received conductor pieces between a clamping surface and a contact wall (lateral wall of the receiving region).

The contact portion can have a clamping device with a clamping element braced in the direction of a contact wall, wherein the clamping element has an inclined insertion surface. This allows easy insertion of the conductor pieces.

The contact wall can transition directly into the edge of the contact portion.

The Method

The object mentioned at the outset is also achieved by a method for reshaping one or more conductor pieces arranged in a stator core, in particular hairpins, wherein the method comprises the following steps:

Arranging the stator core in a provided machining position. In the processing position, the conductor piece or conductor pieces to be reshaped is/are arranged in an initial configuration in such a way that the free ends of the conductor pieces projecting out of the stator core project extended along a longitudinal direction out of the stator core.

Moving a contact portion along the longitudinal direction into a contact position with the conductor piece or conductor pieces. The contact portion is configured to contact the conductor piece or pieces to be reshaped laterally along the longitudinal direction. In the contact position, the conductor piece or conductor pieces is/are received in the contact portion. In the received position, the contact portion makes contact with the conductor pieces at least laterally, but in particular laterally and in the longitudinal direction from the free end of the conductor pieces.

Moving the contact portion in a first bending direction. The first bending direction can be the radial direction or the opposite direction. However, it can also be a direction orthogonal to the radial direction. A direction that is a superimposition of individual directions, e.g., radial direction and direction orthogonal thereto, is conceivable. The orientation of the contact portion, in particular along the longitudinal direction, remains unchanged. The orientation of the end portion of the conductor piece or conductor pieces received in the contact portion also remains unchanged. As a result, the conductor piece or conductor pieces is/are bent around a first bending point in the first bending direction and around a second bending point in a second bending direction. The first and second bending points are arranged spaced apart from each other. The second bending point is defined by an edge of the contact portion. The second bending direction is directed counter to the first bending direction.

This bending while maintaining the orientation (pivot position) of the contact portion corresponds to the first movement step described in connection with the apparatus. The region around the free end, the end portion that terminates in the second bending point, is effectively held in its longitudinal orientation.

The central portion adjoining the end portion and extending between the first bending point and the second bending point is bent/pivoted in the first bending direction, for example radially outward, relative to the part of the conductor piece which is arranged so as to be held immovably in the stator core.

The method further comprises: Pivoting the contact portion in the second bending direction. It is also conceivable to pivot the contact portion in another direction, in particular in a direction parallel to the surface of the stator core. When the contact portion is pivoted, the free end of the conductor piece or the free ends of the conductor pieces is/are bent around the second bending point in the second bending direction with respect to the further course of the conductor piece or conductor pieces. During the pivoting, the first bending point is moved in particular further in the first bending direction. This causes the above-described over-bending at the first and/or second bending point and at least partially compensates for the springback of the conductor piece or conductor pieces after the bending. In other words, the overbending at the first bending point is caused by moving the contact portion further, and the overbending at the second bending point is caused by pivoting in the second bending direction.

Pivoting with further movement of the first bending point over time corresponds to the second movement step described in connection with the apparatus.

During the entire bending process, the conductor piece or conductor pieces can be contacted by the contact portion from the side as well as from the free end. The geometrically determined change in the position of the free end caused by the bending, in particular in the longitudinal direction with respect to the stator core, is compensated for by a movement of the contact portion, in particular in the longitudinal direction. This can be achieved, for example, by a pretensioned contact portion (for example as has already been described in connection with the apparatus, in particular in connection with the piston rod mounted in the first guide element). The contact portion can, for example, be pretensioned by means of a spring in the direction of the stator core, so that it is pressed in the direction of the stator core and follows the movement of the free end of the conductor piece or the free ends of the conductor pieces. The length of the end portion is thus fixed in a structurally simple manner.

The first bending point remains unchanged in its position with respect to the stator core.

The second bending point moves during the second movement step, in particular during the pivoting of the contact portion relative to the stator core. While the contact portion is pivoted in the second bending direction and thereby further moved in the first bending direction, the second bending point is moved in particular in the first bending direction and along the longitudinal direction toward the stator core.

The conductor piece to be reshaped or the reshaped conductor piece can be the radially outermost of the conductor pieces of a row of conductor pieces extended in the radial direction. However, it is also conceivable that this conductor piece is the innermost one of a row of conductor pieces extended in the radial direction. Typically, a plurality of radially outer conductor pieces of a row are reshaped.

More preferably, the first and the second bend run in one plane. Because the conductor piece has only straight (not bent) portions between the two bending points of the same conductor piece, the entire region of the conductor piece projecting out of the stator is arranged in this plane. This plane is preferably spanned by the longitudinal direction and radial direction.

The bending process around the first bending point and/or around the second bending point can in each case take place at a larger angle than is provided in the final desired shape. A springback of the conductor piece or conductor pieces can be at least partially compensated for in this way. The springback is caused by various circumstances. These are, for example, the material of the conductor piece (usually copper), the thickness of the conductor piece, the temperature, etc. It is provided in particular that, after the bending process is complete, the individual conductor pieces are reshaped in such a way that the end portion of the conductor pieces, i.e., the portion around the free end of the conductor piece, runs in the longitudinal direction or parallel to the longitudinal direction.

The method according to the invention can further comprise conductor pieces being used that have been produced by pulling apart (before or after shaping, for example bending into a hairpin). In particular, the conductor pieces can first have been notched laterally, in particular from all sides, before being pulled apart and then have been sectioned to a specific length by being pulled apart. This results in a free end of the conductor pieces which has a tip/parting surface/burr located effectively in the middle or inside the cross section, which in turn facilitates the engagement of the contact portion during the initial "placement over the conductor pieces." In general, the conductor pieces can have an elevation arranged in the interior of the cross section on their free end. In general, the conductor pieces can also taper toward the free end.

BRIEF DESCRIPTION OF THE DRAWINGS

Further features, details and advantages of the invention can be found in the wording of the claims and in the following description of the embodiments with reference to the drawings, in which:

DETAILED DESCRIPTION

In the following description and in the figures, corresponding components and elements have the same reference signs. For the sake of clarity, not all of the reference signs are shown in all of the figures.

Figure 1:
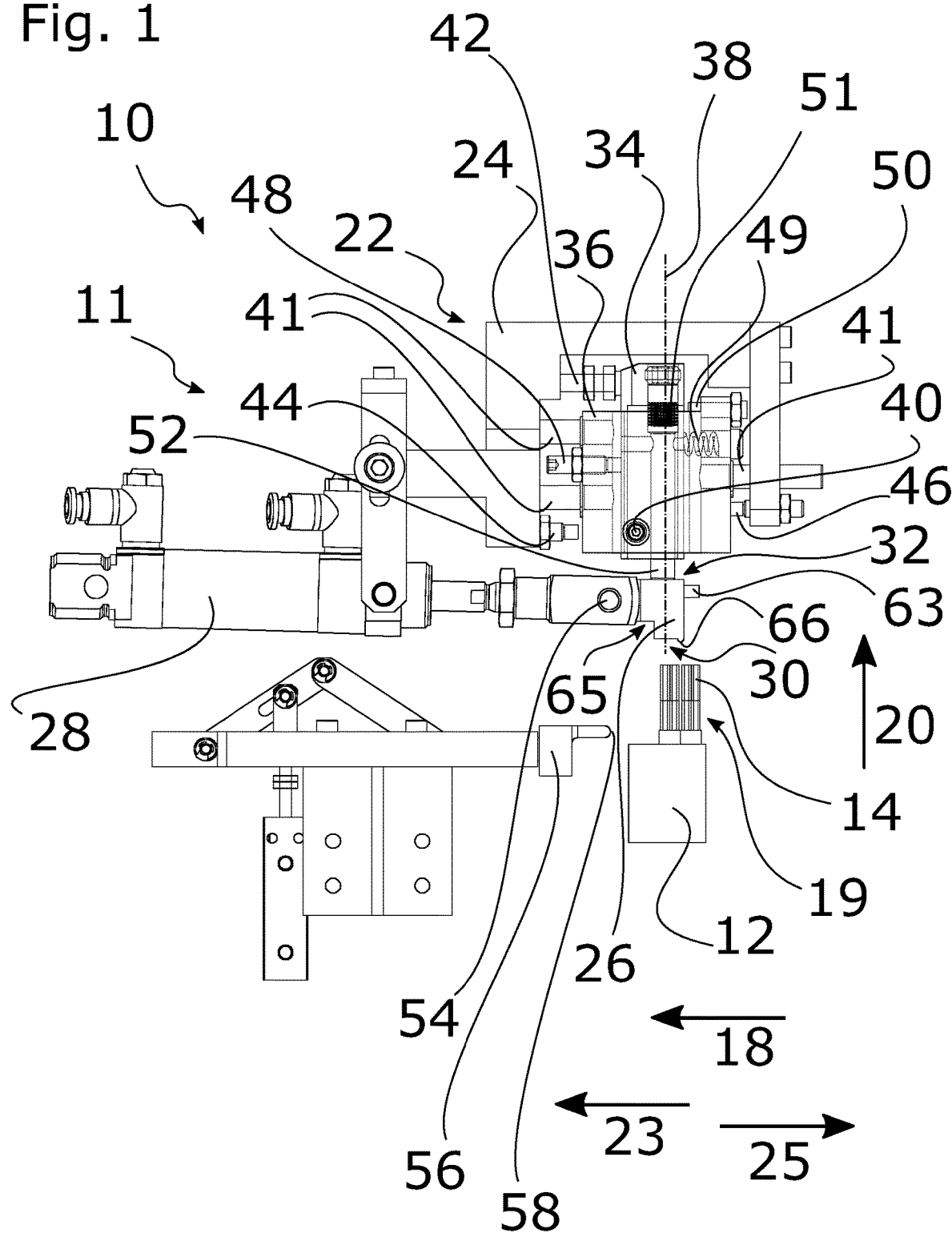
FIG. 1 is a side view of a bending unit and a counter-bearing device of an apparatus according to the invention.
Figure 2:
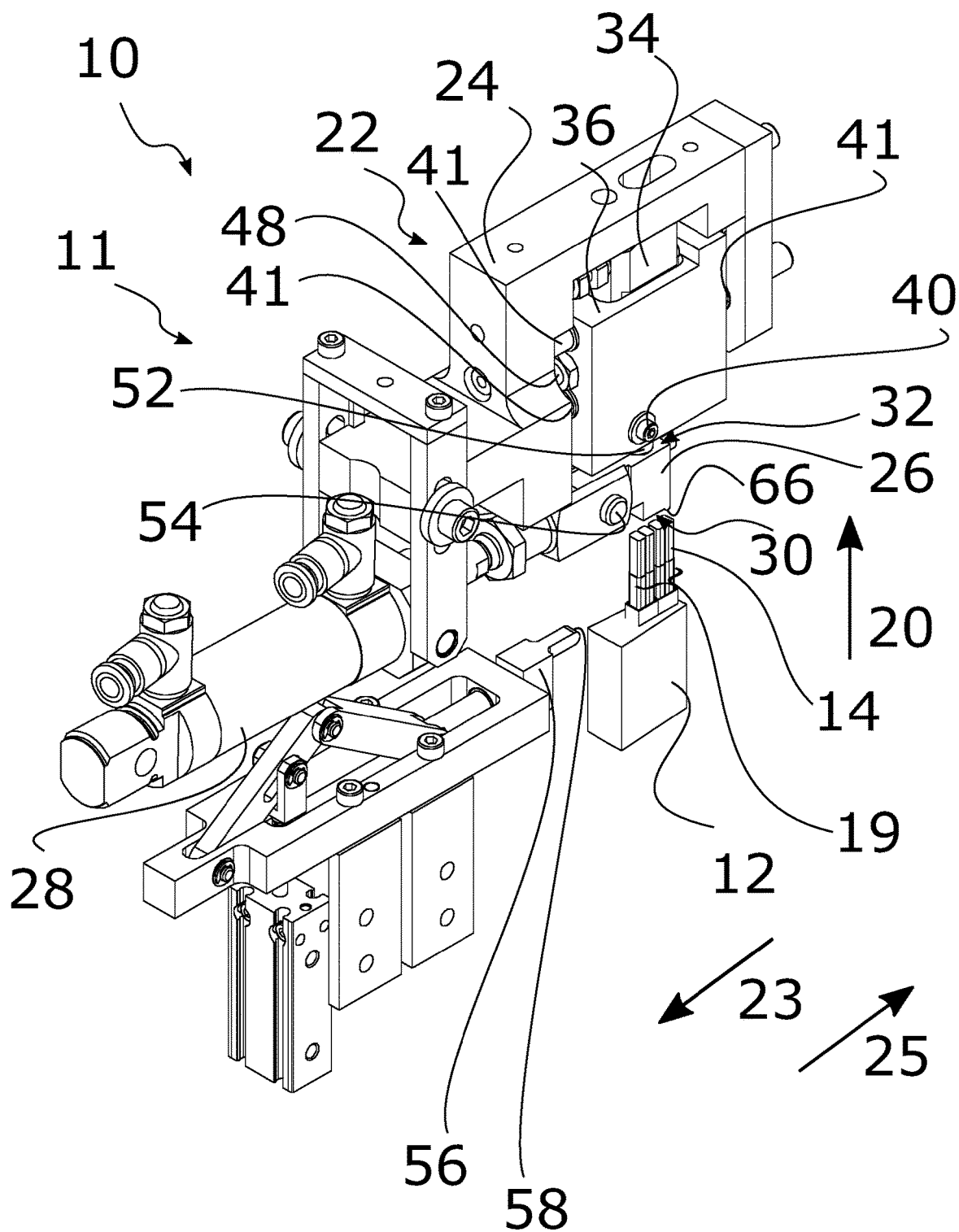
FIG. 2 is a perspective view of the bending unit and the counter-bearing device according to FIG. 1.

FIG. 1 shows a side view of a bending unit 11 and a counter-bearing device 56 of an apparatus 10 according to the invention and FIG. 2 shows a perspective view of the bending unit 11 and the counter-bearing device 56 according to FIG. 1. The starting position of the apparatus 10 is shown. In this initial position, a stator core 12 and conductor pieces 14 arranged therein are accommodated in a receptacle (not shown) in a provided machining position and conductor pieces to be reshaped have not yet been reshaped.

Figure 4:
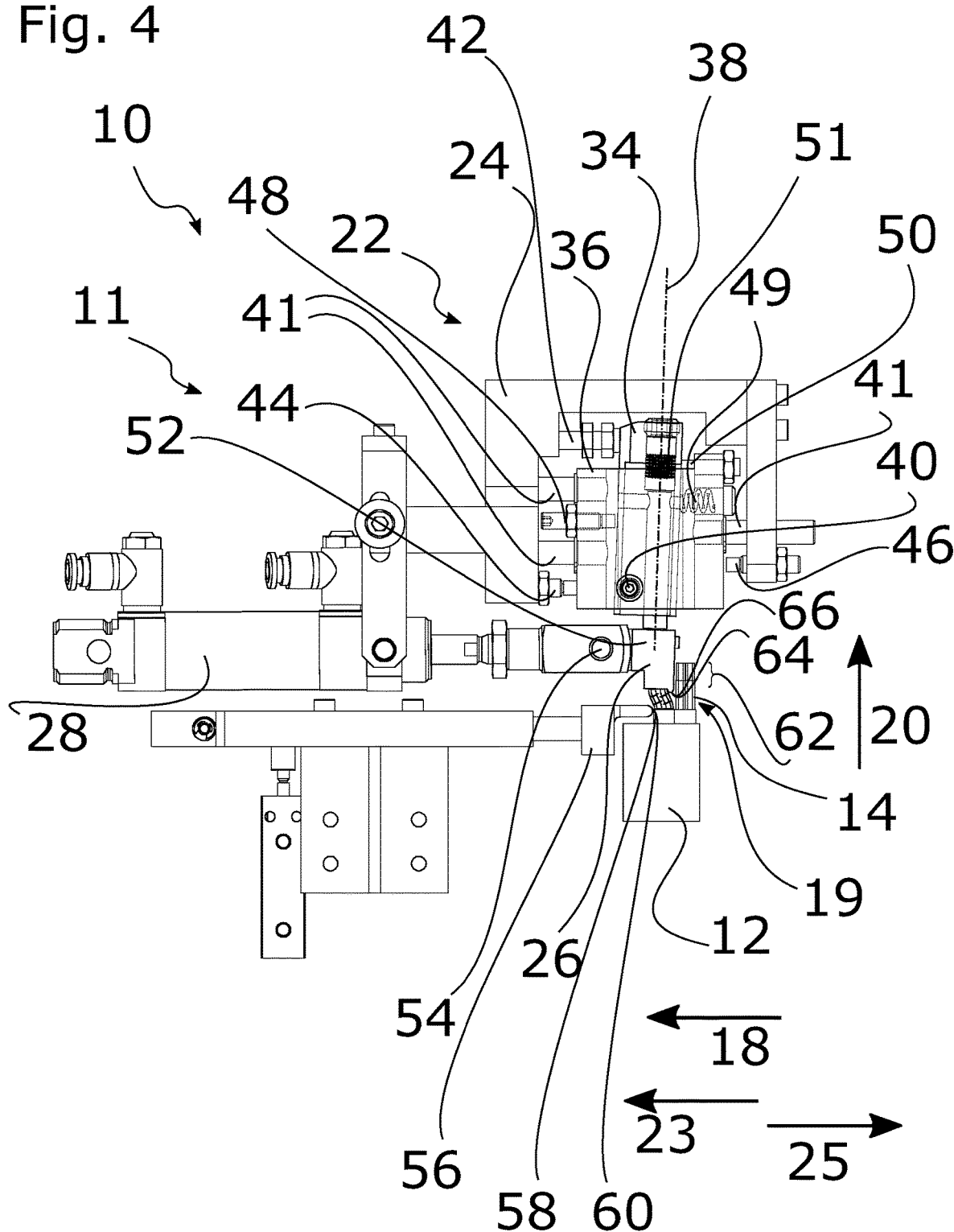
FIG. 4 is a side view of the bending unit and the counter-bearing device according to FIG. 1 in a further state.
Figure 5:
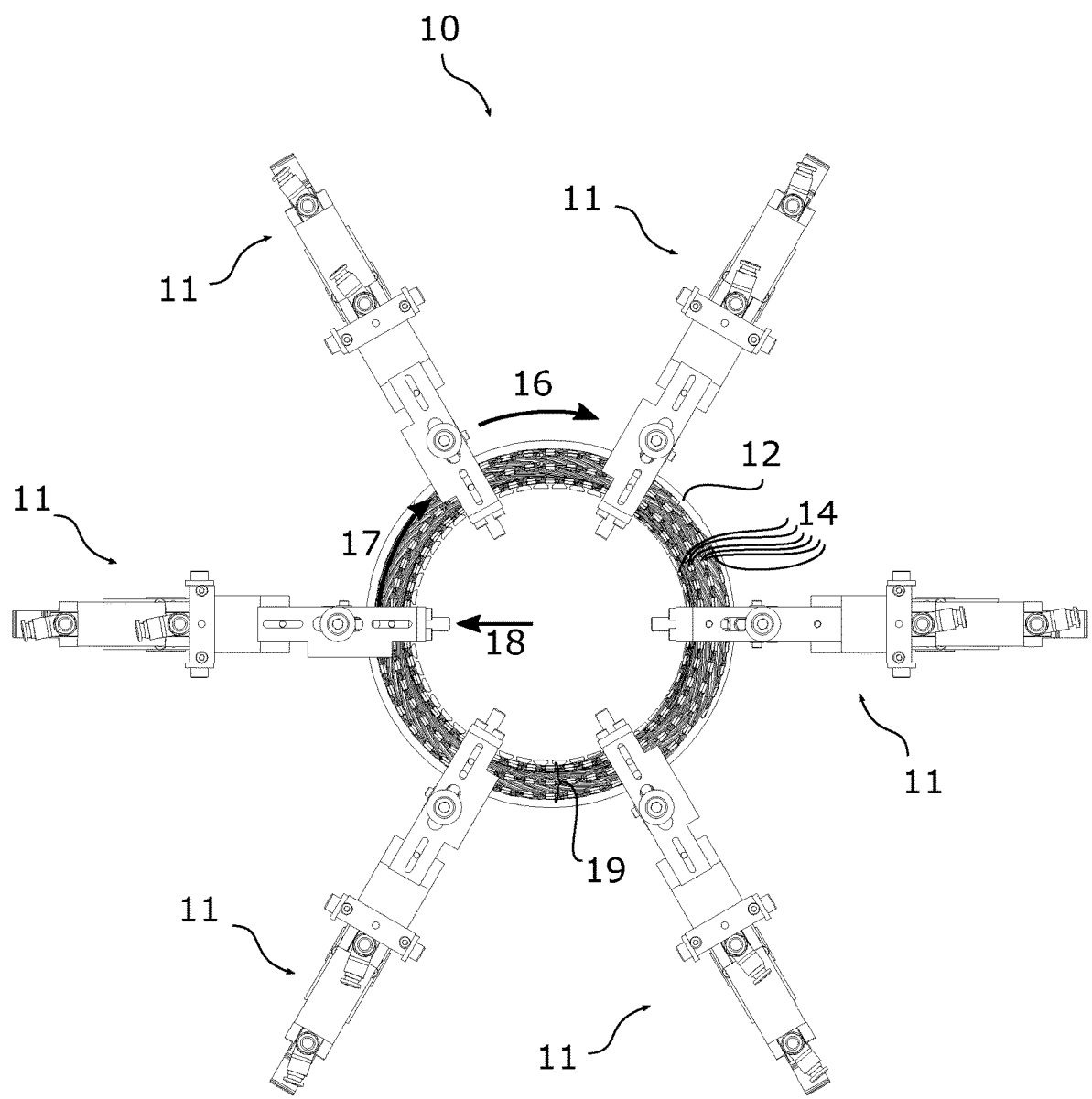
FIG. 5 is a top view of an arrangement of a plurality of bending units according to FIG. 1 of a further apparatus according to the invention.
Figure 6:
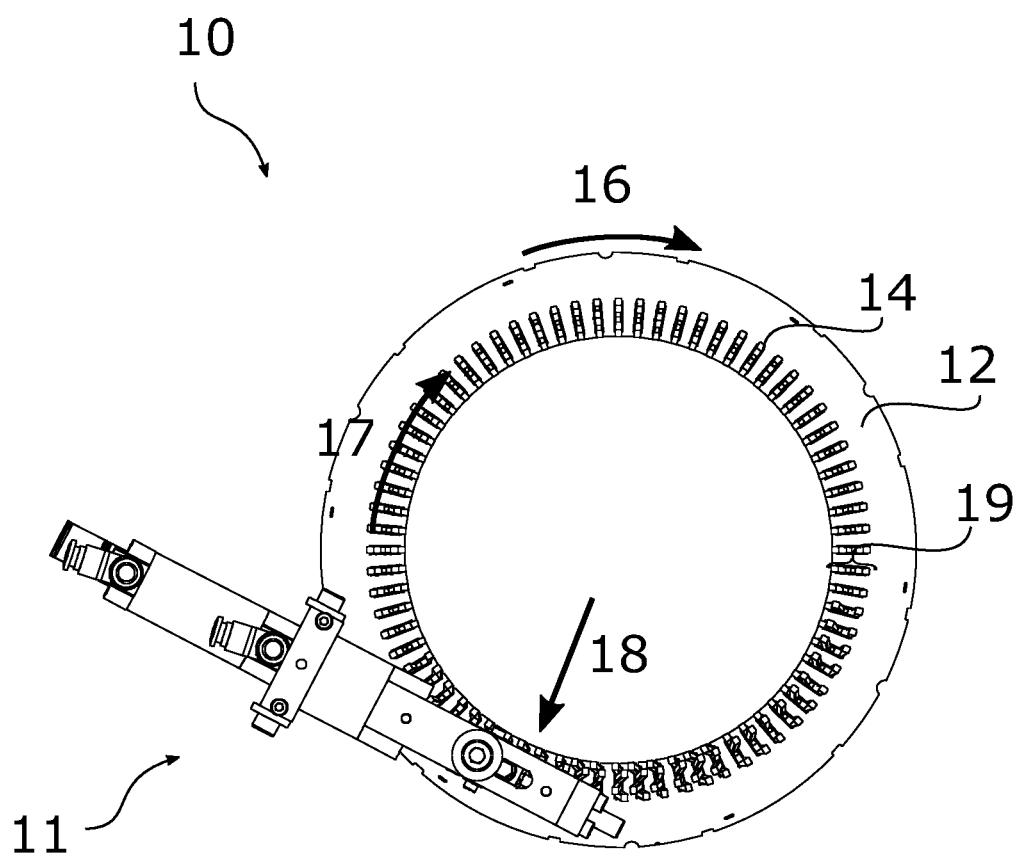
FIG. 6 is a top view of an arrangement of a bending unit according to FIG. 1 of a further apparatus according to the invention.
Figure 7:
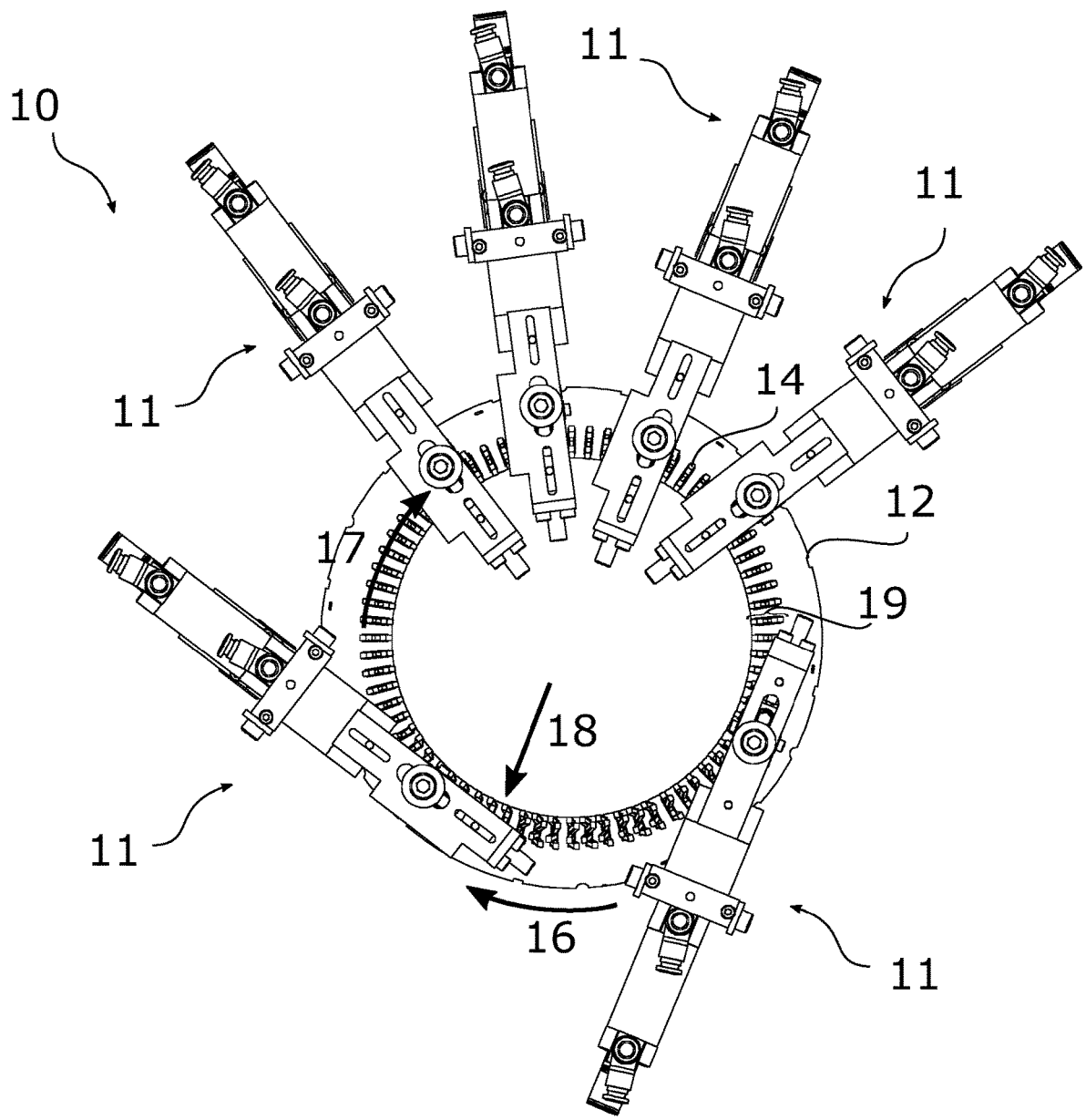
FIG. 7 is a top view of an arrangement of a plurality of bending units according to FIG. 1 of a further apparatus according to the invention.

The conductor pieces 14 are arranged in circular paths 17 running in a circumferential direction 16 in rows 19 in the stator core 12 (see FIG. 5-7). The rows 17 extend along a radial direction 18. The conductor pieces 14 are predominantly so-called hairpins, which have two longitudinally extended members, which in turn are connected to one another via a connecting portion. In the processing position, the conductor pieces 14 to be reshaped (typically members of the hairpins) project out of the stator core 12 along a longitudinal direction 20. This corresponds to the initial configuration of the conductor pieces 14 in which they are located before reshaping. The figures show in each case the free members of the conductor pieces 14, that is to say the longitudinally extended ends of the conductor pieces 14 which face away from any connecting portions that there may be. The stator core 12 can also be seen partially and rather schematically in FIG. 1-4.

The bending unit 11 has a positioning unit 22. This serves to position the bending unit 11 relative to the receptacle or relative to the stator core 12 arranged in the receptacle (not shown). During the reshaping process or the bending process, the positioning unit 22 is arranged fixedly with respect to the receptacle or the stator core 12.

The bending unit 11 also has a contact portion 26 which is configured to be able to contact a conductor piece 14 to be reshaped or a plurality of conductor pieces 14 to be reshaped laterally and from above in the direction toward the stator core 12.

The illustrated contact portion 26 is configured like a sleeve and has a first open end 30. In the operating position, this open end faces the stator core 12. A second closed end 32, opposite the first open end 30, faces away from the stator core 12 in the operating position. The contact portion 26 can thus be placed effectively over a single conductor piece 14 or a plurality of conductor pieces 14, wherein the second closed end 32 forms a stop for the free ends of the conductor pieces 14.

The contact portion 26 can be moved by means of an actuator 28. The contact portion 26 can be moved in a first bending direction 23 and in a second bending direction 25 by means of the actuator 28.

In the embodiment shown here, the first bending direction 23 corresponds to the radial direction 18. The second bending direction 25 is counter to the first bending direction 23.

In this case, the actuator 28 is configured in the form of a linear actuator, which is arranged pivotably on the positioning unit 22 and is also pivotably connected to the contact portion 26.

The positioning unit 22 includes a frame element 24 which remains stationary with respect to the stator core 12 during the reshaping process or the bending process. A first guide element 34 and a second guide element 36 are arranged in the frame element 24.

The first guide element 36 extends longitudinally along an extension axis 38. The first guide element 34 is arranged pivotably mounted in the second guide element 36 at a pivot point 40. The two guide elements are thus pivotably connected to one another via this pivot point 40. The only possible relative movement between the two guide elements is therefore a pivoting movement.

The pivot point 40 is arranged fixed with respect to the second guide element 36.

The second guide element 36 is arranged in the frame element 24 such that it can be moved in a translatory manner along or counter to the first bending direction 23. This translatory movement of the second guide element 36 is brought about by means of a guide. In the illustrated embodiment, the guide is created by three guide rods 41. The guide rods 41 extend into the second guide element 36, wherein it is possible for the guide element 36 to be displaced along the guide rods 41, as a result of which the second guide element 36 is mounted in a straight line guided along the first bending direction 23 or the second bending direction 25.

The guide rods 41 extend in their longitudinal orientation along the first bending direction 23 or the second bending direction 25. They are therefore parallel to each other. The guide rods 41 are fixedly arranged on the frame element 24.

Because the pivot point 40 is fixedly arranged in relation to the second guide element 36, it follows the translatory movement of the second guide element 36. Correspondingly, when the second guide element 36 moves, the pivot point 40 and thus also the first guide element 34 are moved relative to the frame element 24 or to the positioning unit 22.

The frame element 24 is U-shaped in the broadest sense and delimits a free space in which the first guide element 34 and the second guide element 36 are arranged, at least in the first bending direction 23 and the second bending direction 25.

The frame element 24 includes a first stop 42. This is arranged on the frame element 24 and serves for contacting the first guide element 34 when it is moved in the first bending direction 23.

The frame element 24 further comprises a second stop 44. It serves for contacting the second guide element 36 when it is moved in the first bending direction 23.

The first stop 42 and the second stop 44 are on the same side of the frame element 24.

The frame element 24 includes a third stop 46. This third stop serves for contacting the second guide element 36 when said guide element is moved in the second bending direction 25. Correspondingly, the third stop 46 is arranged on the side of the frame element 24 opposite the first stop 42 and the second stop 44. The second guide element 36 is thus arranged to be movable back and forth between the first stop 42 and the second stop 44.

Because the frame element 24 is fixed with respect to the stator core 12 during the bending process, all parts fixedly arranged on the frame element 24, such as, for example, the three guide rods 41, the first stop 42, the second stop 44 and the third stop 46, are also arranged so as to be stationary with respect to the stator core 12 during the bending process.

The second guide element 36 has a fourth stop 48. This fourth stop serves for contacting the first guide element 34 when the guide element is pivoted in the first bending direction 23 about the pivot point 40.

The second guide element 36 also has a first spring 49 which is arranged on the second guide element 36 in the second bending direction 25. The first guide element 34 is braced against the fourth stop 48 in the first bending direction 23 by means of the first spring 49. This position of the first guide element 34 resting against the fourth stop 48 is also referred to below as the contact position. In this contact position of the first guide element 34 shown in FIG. 1, the first guide element 34 is oriented such that its extension axis 38 is aligned parallel to the longitudinal direction 20 and thus parallel to the free ends of the conductor pieces 14 projecting out of the stator core 12. In particular, the extension axis 38 is arranged orthogonally with respect to the first bending direction 23.

The first guide element 34 is connected to the contact portion 26 by means of a piston rod 52. The piston rod 52 is arranged within the first guide element 34 and runs along the extension axis 38. The alignment of the piston rod 52 and the contact element 26 thus always corresponds to the alignment of the first guide element 34 or its extension axis 38. If the first guide element 34 is pivoted about the pivot point 40, its extension axis 38 and also the piston rod 52 together with the contact portion 26 pivots about the pivot point 40 accordingly. The piston rod 52 is pretensioned toward the stator core 12 relative to the first guide element 34 by means of a second spring 51. The piston rod 52, and thus also the contact portion 26 on which the piston rod 52 is arranged, can be moved along the extension axis 38 relative to the first guide element 34 against the spring tension. The piston rod 52 is firmly connected to the contact portion 26. A movement of the piston rod 52 is thus transmitted to the contact portion 26.

The contact portion 26 can therefore both be lowered relative to the frame element 24 or the positioning unit 22 (away from said positioning unit toward the stator core 12) and also moved in the first bending direction 23 and the second bending direction 25. In addition, the contact portion 26 can be pivoted relative to the frame element 24 or the positioning unit 22. In this embodiment, all of this is brought about by means of the actuator 28 articulated on the positioning unit 22. Correspondingly, the actuator 28 is articulated (pivotable) on the frame element 24 or the positioning unit 22. The actuator 28 is also pivotably connected to the contact portion 26 by means of a joint 54. In this case, the joint 54 is designed as a fork head, with which the contact portion 26 is connected in a pivotably mounted arrangement. On the other hand, the actuator 28 is arranged pivotably on the frame element 24 in order in particular to be able to follow the movement of the contact portion 26 along the extension axis 38.

The contact portion 26 can therefore perform a plurality of movements relative to the frame element 24 or the positioning unit 22. A first movement (or type of movement) is a translatory movement along the first bending direction 23 or the second bending direction 25. A second movement is a translatory movement along the extension axis 38. A third movement is a pivoting of the contact portion 26 about the pivot point 40 (wherein the extension axis 38 is also pivoted at the same time).

During the bending process, the contact portion 26 performs a movement that results from a superimposition of these three movements.

When the contact portion 26 is lowered onto the conductor pieces 14, the free ends of the conductor pieces 14 bump against the closed end of the contact portion 26 and move it against the pretensioning by the second spring 51 along the extension axis 38 toward the frame element 24. Correspondingly, when the conductor pieces 14 shorten their extension from the stator core 12 to the positioning unit 22 due to the radially outwardly directed bending, the contact portion 26 is kept in contact with the free ends of the conductor pieces 14 by the spring 51 and moved along the extension axis 38 from the frame element 24 toward the stator core 12. There is effectively a length compensation.

In the first movement step, there is only a translatory movement along the first bending direction 23 and along the extension axis 38. In the second movement step, the pivoting movement about pivot point 40 is also superimposed.

The second guide element 36 includes a fifth stop 50. This serves for contacting the first guide element 34 when it is pivoted in the second bending direction 25. It effectively limits its pivotability.

The stops are adjustable in their position (e.g., can be changed in length by means of a tool).

The apparatus 10 further comprises a counter-bearing device 56. The counter-bearing device 56 has a counter bearing portion 58. In this case, the counter-bearing device 56 is arranged and supported in the apparatus 10 such that its counter-bearing portion 58 can be placed against the radially outermost conductor piece 14. A first bending point 60 is defined by the counter-bearing portion 58 being placed against the conductor piece 14.

The counter-bearing device 56, the actuator 28 and the frame element 14 are arranged essentially in one plane. This leads to a particularly narrow design of the bending unit 11 and/or of the apparatus 10.

Figure 3:
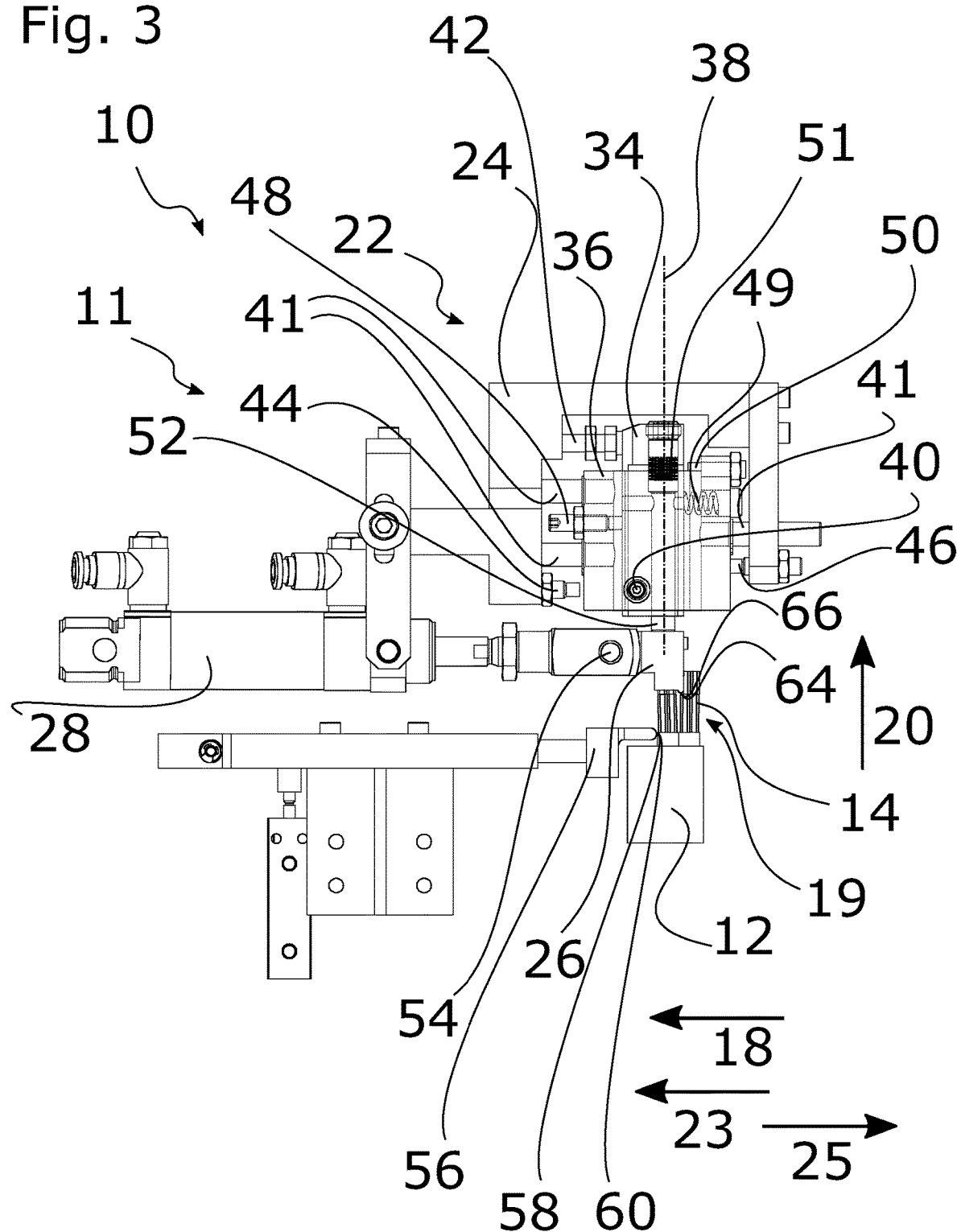
FIG. 3 is a side view of the bending unit and the counter-bearing device according to FIG. 1 in a further state.

FIG. 3 shows a side view of the bending unit 11 and the counter-bearing device 56 according to FIG. 1 in a further state. The position of the bending unit 11 has been changed toward the stator core 12 compared to the initial position shown in FIGS. 1 and 2; in other words, the bending unit has been moved toward the stator core, lowered onto the stator core in the illustration shown in the figures. However, an arrangement of the bending unit underneath (lowering the stator core or raising the bending unit) to the side (moving the stator core and bending unit toward one another) of the stator is also within the meaning of the invention.

By lowering (generally, changing the relative position with respect to one another), the contact portion 26 was moved over the two outermost conductor pieces 14 or, in this case, radially outermost conductor pieces 14, in the first bending direction 23, or it was received in the contact portion 26. The positioning unit 22 has been moved far enough in the direction of the stator core 12 that these two conductor pieces 14 are received with their end portions 62 in the contact portion 26.

The extension of the end portion 62 in the longitudinal direction corresponds to the part of the conductor pieces 14 received in the contact portion, i.e., the inner extension of the contact portion 26 in the longitudinal direction. The closed end 32 of the contact portion 26 forms a stop in the longitudinal direction 20 for the free ends of the conductor pieces 14.

In addition, the positioning unit 22 was moved far enough in the direction of the stator core 12 that the second spring 51 is braced in the longitudinal direction 20 by the pressing of the contact portion 26 and thus of the piston rod 52. In this way, the free ends of the conductor pieces 14 received or contacted in the contact portion 26 are subjected to a force in the direction of the stator core 12.

The end portions 62 are clamped in the contact portion in the lateral direction. This can be recognized by the change in the position of an extension 63 of a clamping device 65 arranged in the contact portion 26 that projects out of the contact portion 26. The clamping device 65 is configured in such a way that the conductor pieces located in the contact portion 26 are pressed from the inside against the radially inwardly arranged wall of the contact portion and bear against it.

The counter-bearing device 56 was moved in FIG. 3 in the direction of the stator core 12 such that the counter-bearing portion 58 bears against the conductor piece 14 that is outermost in the first bending direction 23 and thus spatially defines the first bending point 60.

By moving the contact portion 26 between the individual conductor pieces 14, a small gap is created between the conductor pieces 14 to be reshaped and the remaining conductor pieces 14 in the row 19. For this purpose, the contact portion 26 in this case has a rounded edge 66. The edge 66 is rounded, wherein the rounding in this case is created by a semicircular cross section. In this case, this is configured with a radius of 0.5 mm. Other cross sections tapering toward the conductor pieces are also within the meaning of the invention. The edge 66 also defines the second bending point 64, which will be discussed further below.

The conductor pieces 14 received or contacted by the contact portion 26 are therefore already minimally bent around the first bending point 60. However, this bending is negligible, and this bending is not what is referred to when the bending and/or reshaping process is mentioned.

From this starting position of the apparatus 10 shown in FIG. 3, the actual bending process is started.

FIG. 4 shows a side view of the bending unit 11 and the counter-bearing device 56 according to FIG. 1 in a further state. The final position of the apparatus 10 can be seen after the bending process has been carried out.

The bending process is started by actuating the actuator 28. The actuator 28 moves the contact portion 26 in the first bending direction 23. Because the contact portion 26 is connected to the first guide element 34 via the piston rod 52, said element is also moved in the first bending direction 23.

The first guide element 34 is connected to the second guide element 36 via the pivot point 40 and in the contact position is braced against the fourth stop 48 by means of the first spring 49. As a result, the movement of the first guide element 34 in the first bending direction 23 is transferred to the second guide element 36. The second guide element 36 is guided in a straight line by the three guide rods 41 parallel to the first bending direction 23 and second bending direction 25, respectively. The contact portion 26, the piston rod 52, the first guide element 34 and the second guide element 36 move in a first movement step in the first bending direction 23.

The conductor pieces 14 received or contacted in the contact portion 26 are likewise moved in the first bending direction 23. These conductor pieces 14 are bent in the first bending direction 23 around the first bending point 60. A second flex point 64 is defined by the edge 66 of the contact portion 26. The conductor pieces 14 received in the contact portion 26 or contacted thereby are in contact with the contact portion 26 along their end portions 62 and in the contact portion 26 are fixed in their alignment with respect thereto. Thus, the movement of the contact portion 26 in the first bending direction 23 shifts the end portions 62 in a translatory manner (the direction will be explained in more detail later). The orientation of the end portions 62 remains parallel to the longitudinal direction 20, so that the end portions are bent during the movement (1st movement step) of the contact portion 26 in the first bending direction 23 around the second bending point 64 with respect to the central portions (between the first and second bending points) in the second bending direction 25. The conductor pieces 14 are widened by the first and second bends that are created in this way.

During the first movement step of the bending process, the free ends of the conductor pieces 14 received or contacted in the contact portion 26, due to geometry, move in the direction of the stator core 12. The second bending point 64 therefore moves toward the stator core 12. In other words, the expanded conductor pieces 14 become shorter in relation to the longitudinal direction 20 as a result of the bending. Because the contact portion 26 is acted upon by the second spring 51 via the piston rod 52 in the direction of the stator core 12, the contact portion 26 follows this movement of the free ends of the conductor pieces 14, so that throughout the bending process the end portions 62 are accommodated in the contact portion 26 or contacted by them. In other words, the end portions 62 of the conductor pieces 14 do not move relative to the contact portion 26.

The contact portion 26, the piston rod 52, the first guide element 34 and the second guide element 36 are moved in the first bending direction 23 until the first guide element 34 bumps against the first stop 42. As the contact portion 26, the piston rod 52 and the second guide element are moved further in the first bending direction 23, the first stop 42 forces the first guide element 34 to pivot relative to the second guide element 36 in the second bending direction and about the pivot point 40. The pivot point 40 is stationary with respect to the second guide element 36 and thus also moves in the first bending direction. In this second movement step of the bending process, the piston rod 52 arranged therein and thus also the contact portion 26 are also pivoted when the first guide element 34 is pivoted. The end portions 62 of the conductor pieces 14 received or contacted in the contact portion 26 are also pivoted in the second bending direction 25. The pivoting process is ended by the fifth stop 50. The first guide element 34 pivots in the second bending direction 25 until the first guide element 34 hits the fifth stop 50, which is arranged so as to be stationary on the second guide element 36, and thus reaches its final pivot position. Finally, the second movement step ends when the second guide element 36 contacts the second stop 44.

As a result of the first movement step in the first bending direction 23, the conductor pieces 14 received or contacted in the contact portion 26 are moved far enough in the first bending direction 23 that there is enough space for the pivoting process in the second bending direction 25 of the second movement step for the end portions 62 of the conductor pieces 14 received or contacted by the contact portion 26.

After the second movement step, the positioning unit 11 and the counter-bearing device 56 are moved away from the stator core 12, so that the reshaped (expanded) conductor pieces 14 are released.

The orientation of the end portions 62 of the widened conductor pieces 14 is inclined with respect to the longitudinal axis 20 after the second movement step or the pivoting in the second bending direction 25. Due to the springback of the material of the conductor pieces 14 around the first and second bending point, the end portions 62 of the widened conductor pieces 14 pivot back again against the bending that was carried out, so that the orientation of the end portions 62 of the widened conductor pieces 14 is usually parallel to the longitudinal axis 20 again.

FIG. 5 shows a top view of an arrangement of a plurality of bending units 11 of a further apparatus 10 according to the invention. The bending unit 11 involves bending units 11 according to FIG. 1. Due to the narrow design of the bending units 11, a plurality of the bending units 11 can be arranged in a radially extending manner and distributed around the stator core 12 in the circumferential direction. An arrangement with six bending units 11 is shown in FIG. 5. A simultaneous expansion of one conductor piece 14 or a plurality of conductor pieces 14 on six rows 19 of conductor pieces 14 is thus possible at the same time. The available installation space can thus be optimally used. The space between the bending units 11 shown can be used, for example, by an arrangement of further machines and/or tools.

It is also conceivable to arrange the bending unit 11 in such a way that the innermost conductor piece 14 in a row 19 of conductor pieces 14 or a plurality of inner conductor pieces 14 can be widened inward in the radial direction, i.e., counter to the radial direction 18. Here, too, a plurality of bending units 11 can be arranged in a space-saving manner radially around the stator core 12 due to their compact and, in particular, narrow design.

FIG. 6 shows a top view of an arrangement of a bending unit 11 of a further apparatus 10 according to the invention. The bending unit 11 shown here involves a bending units 11 according to FIG. 1. A tangential arrangement of the bending unit 11 on the stator core 12 can be seen. This allows a conductor piece 14 or a plurality of conductor pieces 14 to be widened in the circumferential direction, that is to say orthogonally to the radial direction 18. Here, too, a plurality of bending units 11 can be optimally arranged on the stator core 12 due to the compact design of the bending unit 11.

FIG. 7 shows a top view of an arrangement of a plurality of bending units 11 of a further apparatus 10 according to the invention. The bending unit 11 involves bending units 11 according to FIG. 1. A tangential and a radial arrangement of the bending units 11 in combination with one another can be seen. In this way, a plurality of conductor pieces 14 can be expanded simultaneously along the radial direction 18 and orthogonally thereto.

In the apparatuses such as, for example, according to FIGS. 5 to 7, the stator core 12 can be rotatably arranged so that the individual rows 19 can each be moved under the bending units 11 by a rotation of the stator core 12. Additionally or alternatively, the bending units 11 can be movably arranged in the apparatus.

FIGS. 8 to 11 show a contact portion 26 as can be used for carrying out the method according to the invention and in the apparatuses 10 according to the invention.

The contact portion has an edge 66 that tapers toward the conductor pieces 14. The edge 66 serves for the engagement between adjacent conductor pieces 14.

Figure 8:
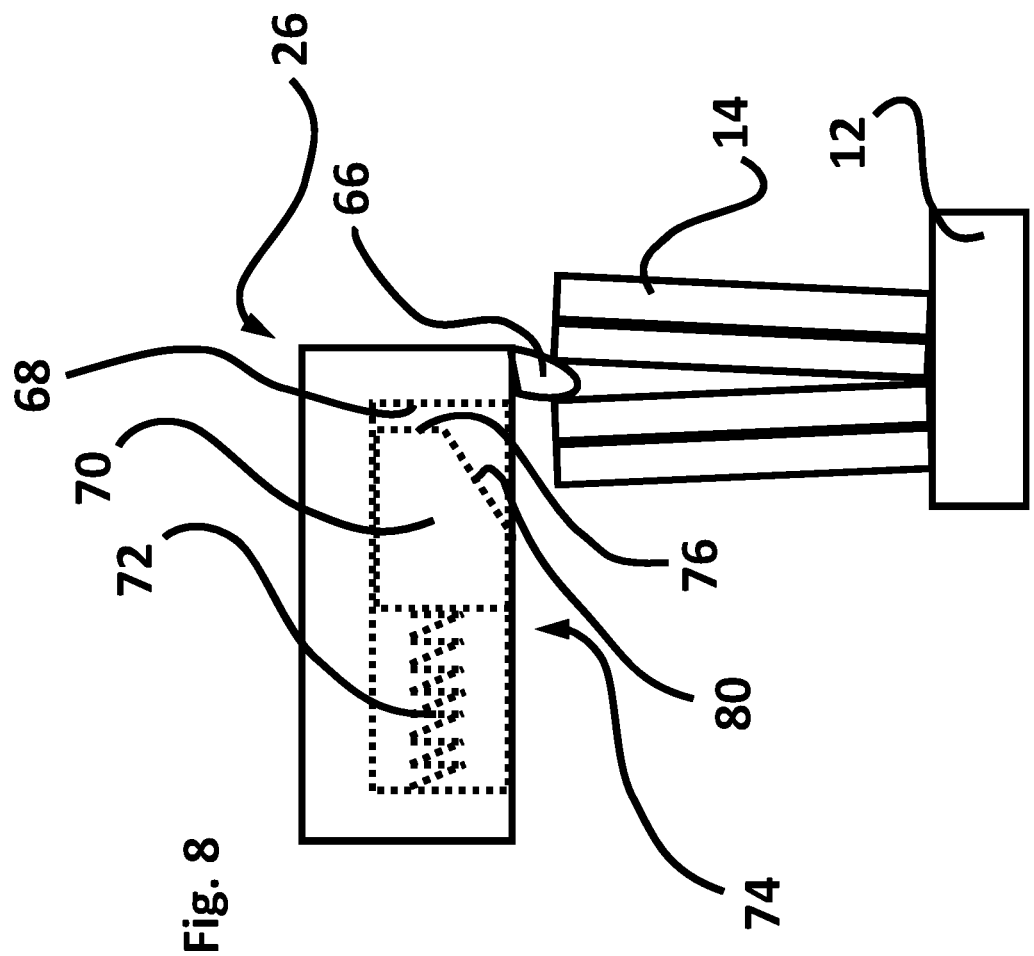
FIG. 8 is a schematic representation of a contact portion.
Figure 9:
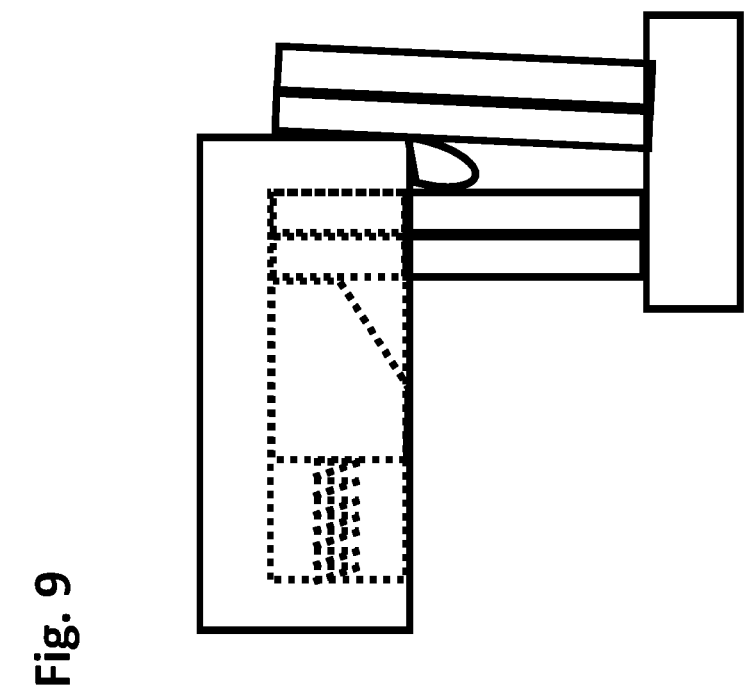
FIG. 9 is a further schematic representation of the contact portion from FIG. 8.

In the illustration of FIG. 8, the edge 66 grips directly between two adjacent conductor pieces 14 and spreads the radially outer conductor pieces 14 slightly away from the radially inner conductor pieces 14. The radially outer conductor pieces 14 are then accommodated in the contact portion which is shown in FIG. 9.

The contact portion 26 comprises a clamping device 65. In this embodiment, the clamping device 65 in turn comprises a clamping element 70 which is arranged braced by a spring 72 in a receiving region 74, which is configured in this case as a blind-hole-like receptacle. A clamping surface 76 of the clamping element 70 is spring-biased in the direction of an inner contact wall 68 of the contact portion. Adjoining the clamping surface 76, the clamping element 70 comprises an inclined insertion surface 80.

The inclined insertion surface 80 is arranged and configured in such a way that, when the conductor pieces 14 contact the insertion surface 80, the clamping element 70 is pushed away from the contact wall 68 against the spring bias until the conductor pieces are clamped or kept clamping between the clamping surface 76 and the contact wall 68. The free ends of the conductor pieces 14 are then in contact with an upper wall of the receiving region 74, which effectively forms a vertical stop and defines the extension of the end portion 62 received in the contact portion or its receiving region.

Figure 11:
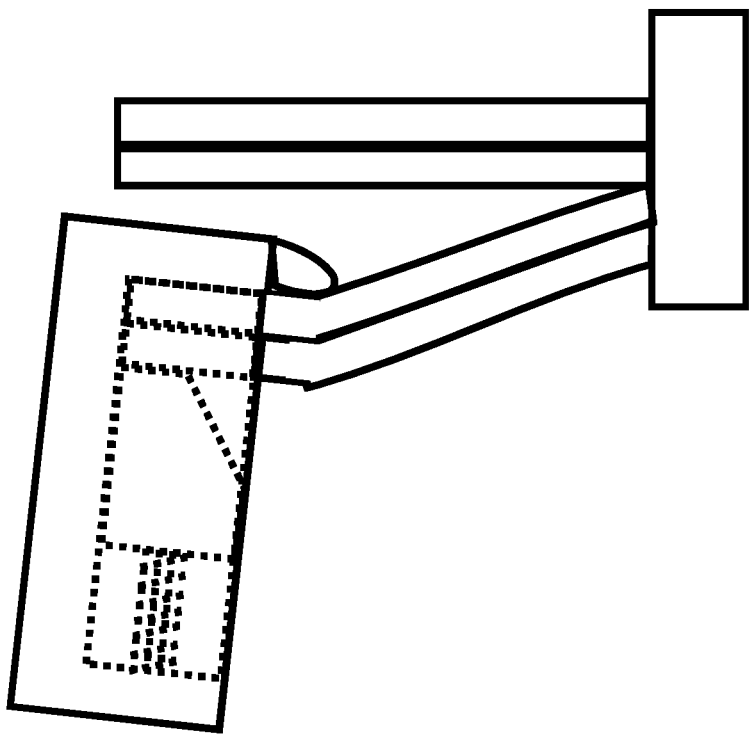
FIG. 11 is a further schematic representation of the contact portion from FIG. 8.
Figure 10:
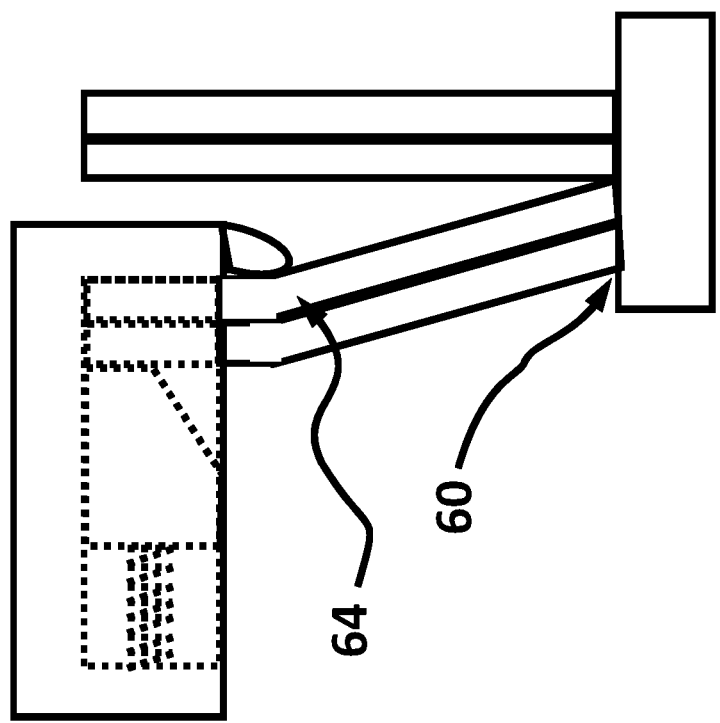
FIG. 10 is a further schematic representation of the contact portion from FIG. 8.

FIG. 10 illustrates the end position after the first evaluation step has been carried out. This is followed by the second movement step, the end position of which is illustrated in FIG. 11.

Figure 13:
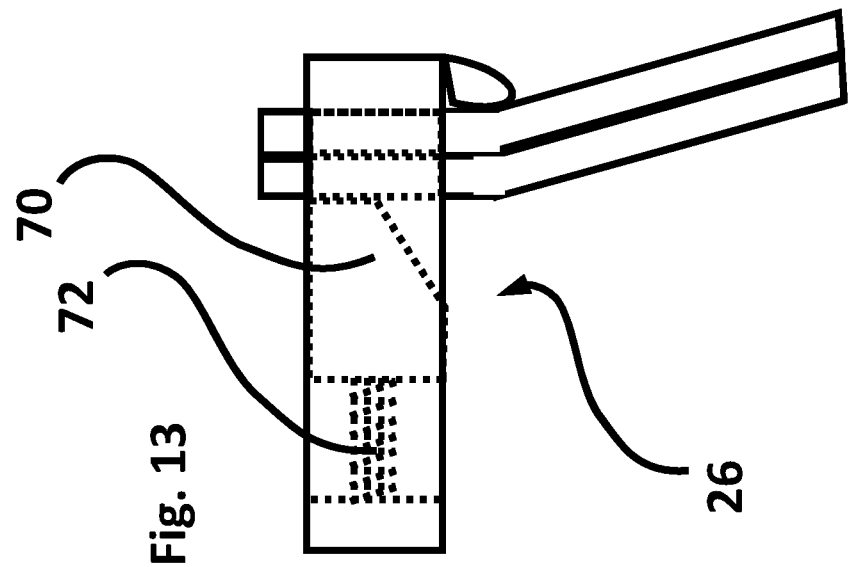
FIG. 13 is a further schematic representation of the contact portion from FIG. 12.
Figure 12:
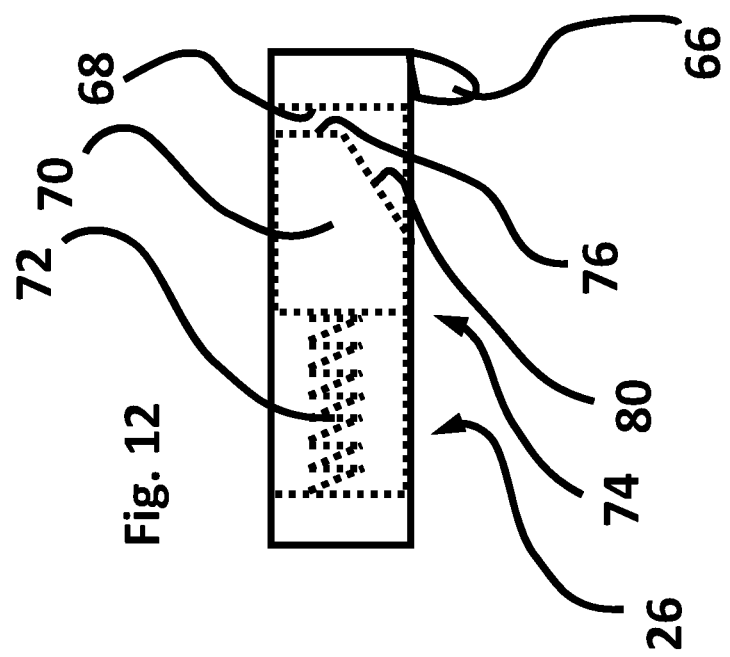
FIG. 12 is a schematic representation of an alternative contact portion.

FIGS. 12 and 13 show an alternative contact portion 26 as can be used for carrying out the methods according to the invention and in the apparatuses 10 according to the invention. The contact portion 26 or its receiving region 74 is open at the top, so that the conductor pieces 14 can be inserted through the receiving region 74. In the recorded state, its configuration corresponds to that shown in FIG. 13. FIG. 13 corresponds here to the end of the first movement step, similar to that shown in FIG. 10.

Figure 14:
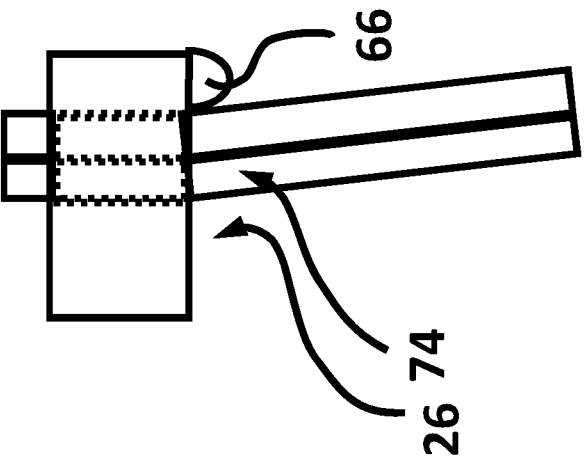
FIG. 14 is a schematic representation of an alternative contact portion.

FIG. 14 shows a further alternative contact portion 26, as can be used to carry out the method according to the invention and in the apparatuses 10 according to the invention. On the one hand, this contact portion has a slightly differently configured edge 66, which is formed more like a semicircle, while the edge 66 of FIG. 8-13 in each case has a rounded hook shape. The shape of the edge 66 here can also be configured differently in the respective contact portions 26. In particular, the edge is rounded in each case and/or, in particular on its side facing the conductor pieces, it tapers toward them. On the other hand, the contact portion 26 from FIG. 14 also has no clamping device 65. The contact portion 26 has a receiving region 74 which is matched to the dimensions of two conductor pieces 14 (the number can be varied depending on the application) and has a width such that the two conductor pieces 14 can be passed through the receiving region 74 and then be contacted laterally from both sides by the two side walls of the receiving region 74. It is also possible to use such a contact portion 26 in order to use the one top wall which forms a certain vertical stop (as shown in the example of FIG. 8-11).

Figure 15:
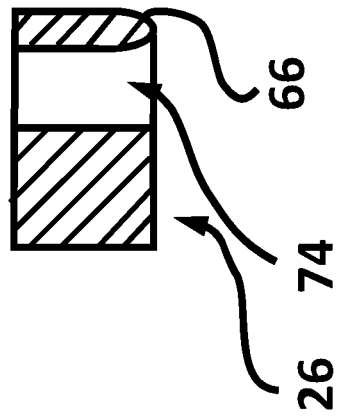
FIG. 15 is a sectional view of an alternative contact portion.

FIG. 15 shows a further alternative contact portion 26 in a sectional illustration as can be used for carrying out the method according to the invention and in the apparatuses 10 according to the invention. This contact portion 26 has an edge 66 offset from the conductor pieces relative to the embodiment of FIG. 14.

The invention claimed is:

1. Method for reshaping one or more conductor piece(s) arranged in a stator core, wherein a plurality of conductor pieces is arranged in the stator core, said conductor pieces being arranged on a plurality of circular paths running in a circumferential direction in rows which extend in a radial direction, wherein the reshaping takes place in a free end of the conductor piece projecting out of the stator core, wherein the procedure comprises: arranging the stator core in a provided machining position in which the conductor pieces to be reshaped are arranged in an initial configuration before reshaping such that the free ends of the conductor pieces projecting out of the stator core project extended along a longitudinal direction out of the stator core; moving a contact portion, which is configured to laterally contact the conductor piece to be reshaped or the conductor pieces to be reshaped, along the longitudinal direction into a contact position with the conductor piece or the conductor pieces in which the conductor piece or the conductor pieces are accommodated in the contact portion and contacted thereby at least laterally; moving the contact portion in a first bending direction, wherein an orientation of the contact portion remains unchanged, so that the conductor piece or conductor pieces accommodated in the contact portion is/are bent around a first bending point in the first bending direction and an end portion of the conductor piece or conductor pieces extending from the free end in the longitudinal direction remains in its orientation, and a second bending point, which is spaced apart from the first bending point, is defined by an edge of the contact portion, so that the conductor piece or conductor pieces accommodated in the contact portion is/are bent around the second bending point in a second bending direction; pivoting of the contact portion such that the free end of the conductor piece or the free ends of the conductor pieces is/are bent in relation to the further course of the conductor piece or the conductor pieces around the second bending point in the second bending direction.

2. Method according to claim 1, characterized in that during the entire bending process the conductor piece or the conductor pieces is/are contacted from the side as well as from its free end by the contact portion and the change in the position of the free end in the longitudinal direction is compensated by a movement of the contact portion in order to maintain contact with the free end.

3. Method according to claim 1, characterized in that, while the contact portion is being pivoted, the second bending point is moved relative to the stator core.

4. Method according to claim 1, characterized in that the bend around the first bending point and the bend around the second bending point run in one plane.

5. Method according to claim 1, characterized in that the bending at the first bending point and/or at the second bending point is by a greater angle than that provided for in the final desired shape, so that springback of the conductor piece or conductor pieces is/are at least partially compensated.

6. Method according to claim 1, characterized in that an apparatus is used for carrying out the method, wherein the apparatus is one for reshaping one or more conductor pieces arranged in a stator core, wherein a plurality of conductor pieces is arranged in the stator core, and is arranged on a plurality of circular paths running in a circumferential direction in rows which extend along a radial direction, wherein the reshaping takes place in a free end of the conductor piece projecting out of the stator core, wherein the apparatus comprises: a receptacle for the stator core in a provided machining position in which the conductor pieces to be reshaped are arranged in an initial configuration before reshaping such that the conductor pieces projecting from the stator core project extended along a longitudinal direction out of the stator core; at least one bending unit for reshaping the conductor piece or pieces, wherein the bending unit in turn comprises: a positioning unit for positioning the bending unit relative to the receptacle for the stator core a contact portion which is configured to laterally contact the one or more conductor pieces to be reshaped; an actuator which is arranged and configured to move the contact portion relative to the positioning unit in order to reshape the conductor piece or pieces; characterized in that the contact portion is mounted in the positioning unit in such a way that when the actuator is actuated, the contact portion is moved in a first movement step relative to the positioning unit in a first bending direction without changing its pivot positioning and in a second movement step, the movement of the contact portion in the first bending direction is superimposed with a pivoting movement.

* * * * *